(12) United States Patent
Hung

(10) Patent No.: US 9,976,699 B2
(45) Date of Patent: May 22, 2018

(54) LOAD-ADJUSTABLE DISPLAY SUPPORT DEVICE

(71) Applicant: Modernsolid Industrial Co., Ltd., Taichung (TW)

(72) Inventor: Chin-Jui Hung, Taichung (TW)

(73) Assignee: Modernsolid Industrial Co., Ltd., Taichung (TW)

( * ) Notice: Subject to any disclaimer, the term of this patent is extended or adjusted under 35 U.S.C. 154(b) by 0 days. days.

(21) Appl. No.: 15/367,740

(22) Filed: Dec. 2, 2016

(65) Prior Publication Data

US 2017/0159879 A1 Jun. 8, 2017

(30) Foreign Application Priority Data

Dec. 8, 2015 (TW) .............................. 104219627 U

(51) Int. Cl.
*F16M 11/24* (2006.01)
*F16M 13/02* (2006.01)
*F16M 11/42* (2006.01)

(52) U.S. Cl.
CPC .......... *F16M 13/022* (2013.01); *F16M 11/24* (2013.01); *F16M 11/42* (2013.01); *F16M 2200/025* (2013.01); *F16M 2200/047* (2013.01)

(58) Field of Classification Search
CPC ........... F16M 13/022; F16M 2200/025; F16M 2200/047; F16M 11/10; F16M 11/24; F16M 11/42; F16M 13/02
USPC ... 248/578, 648, 123.11, 162.1, 280, 295.11, 248/297.11
See application file for complete search history.

(56) References Cited

U.S. PATENT DOCUMENTS

| 2,168,209 | A  | * | 8/1939  | Haupt    | A61B 6/447   |
|           |    |   |         |          | 248/572      |
| 6,189,849 | B1 | * | 2/2001  | Sweere   | A47B 21/0314 |
|           |    |   |         |          | 248/286.1    |
| 7,810,773 | B2 | * | 10/2010 | Chi      | F16M 11/2064 |
|           |    |   |         |          | 248/121      |
| 7,887,014 | B2 | * | 2/2011  | Lindblad | F16M 11/10   |
|           |    |   |         |          | 248/123.11   |
| 8,047,479 | B2 | * | 11/2011 | Liu      | F16M 11/105  |
|           |    |   |         |          | 248/157      |
| 8,081,431 | B2 | * | 12/2011 | Fan      | F16M 11/046  |
|           |    |   |         |          | 248/917      |
| 8,104,728 | B2 | * | 1/2012  | Chen     | E05B 73/0082 |
|           |    |   |         |          | 248/286.1    |
| 8,272,617 | B2 | * | 9/2012  | Huang    | F16M 11/18   |
|           |    |   |         |          | 248/422      |

(Continued)

*Primary Examiner* — Nkeisha Smith
(74) *Attorney, Agent, or Firm* — Husch Blackwell LLP

(57) ABSTRACT

A load-adjustable display support device includes a support frame having opposite frame top and bottom ends, a sliding unit slidable along the support frame, and a load-adjusting unit disposed between the sliding unit and the support frame and including at least one tension spring and an adjustment member. The at least one tension spring can generate a tension force to bias the sliding unit to move between upper and lower limiting positions, where the sliding unit is proximate to the frame top and bottom ends, respectively. The adjustment member is disposed on the support frame and is operable to move a spring top end of the at least one tension spring along the length of the support frame for adjusting a tension of the at least one tension spring.

6 Claims, 7 Drawing Sheets

(56) References Cited

U.S. PATENT DOCUMENTS

| | | | | |
|---|---|---|---|---|
| 8,276,869 B2* | 10/2012 | Huang | ............... | F16M 11/18 248/422 |
| 8,567,735 B2* | 10/2013 | Burgess | ............... | F16M 11/10 248/280.11 |
| 8,826,831 B2* | 9/2014 | Hazzard | ............... | A47B 21/02 108/50.01 |
| 8,905,496 B2* | 12/2014 | Burgess | ............... | A47B 21/00 108/50.02 |
| 8,967,560 B2* | 3/2015 | Ergun | ............... | A47B 9/12 108/147 |
| 9,046,213 B2* | 6/2015 | Huang | ............... | F16M 11/046 |
| 9,080,721 B2* | 7/2015 | Hazzard | ............... | A47B 21/02 |
| 9,091,393 B2* | 7/2015 | Huang | ............... | F16M 11/046 |
| 9,188,275 B2* | 11/2015 | Ergun | ............... | A47B 21/02 |
| 9,222,616 B2* | 12/2015 | Ergun | ............... | F16M 11/10 |
| 9,279,537 B2* | 3/2016 | Hung | ............... | F16M 11/18 |
| 9,582,023 B2* | 2/2017 | Aoyagi | ............... | G05G 1/025 |
| 2009/0166302 A1* | 7/2009 | Hung | ............... | F16M 11/041 211/26.1 |
| 2011/0233350 A1* | 9/2011 | Burgess | ............... | F16M 11/10 248/123.11 |
| 2012/0025055 A1* | 2/2012 | Huang | ............... | F16M 11/18 248/422 |
| 2012/0119040 A1* | 5/2012 | Ergun | ............... | A47B 21/02 248/126 |
| 2012/0187056 A1* | 7/2012 | Hazzard | ............... | A47B 21/02 211/26 |
| 2012/0187256 A1* | 7/2012 | Ergun | ............... | A47B 9/12 248/123.11 |
| 2012/0256069 A1* | 10/2012 | Fallows | ............... | F16M 11/046 248/295.11 |
| 2014/0034799 A1* | 2/2014 | Fallows | ............... | F16M 11/046 248/297.21 |
| 2014/0332653 A1* | 11/2014 | Hazzard | ............... | A47B 21/02 248/411 |
| 2015/0208799 A1* | 7/2015 | Ergun | ............... | A47B 21/02 108/42 |
| 2015/0320202 A1* | 11/2015 | Hazzard | ............... | A47B 21/02 248/447.1 |
| 2017/0112276 A1* | 4/2017 | Hazzard | ............... | A47B 21/04 |

* cited by examiner

LOAD-ADJUSTABLE DISPLAY SUPPORT DEVICE

CROSS-REFERENCE TO RELATED APPLICATION

This application claims priority to Taiwanese Patent Application No. 104219627, filed on Dec. 8, 2015.

FIELD

The disclosure relates to a display support device, and more particularly to a load-adjustable display support device.

BACKGROUND

A conventional wall-mounted display support device is generally mounted on a wall of a hospital room and other special places. The conventional wall-mounted display support device includes a support frame, a sliding unit slidably disposed on the support frame, and a mounting seat disposed on the sliding unit for mounting a display thereon. The sliding unit includes a sliding member slidably disposed on the support frame, and a pressure cylinder for driving the sliding member to move the mounting seat upward and downward. Through this, the height of the mounting seat and the display can be adjusted, and a medical person can adjust the display according to the desired height.

Although the pressure cylinder can precisely control the upward and downward movement of the sliding member, the cost of the pressure cylinder is relatively high, thereby increasing the product manufacturing cost. In addition, because the weight of the display carried by the mounting seat cannot be determined, whether the pressure cylinder is capable of supporting the load or not may adversely affect the smooth movement of the display.

SUMMARY

Therefore, an object of the disclosure is to provide a load-adjustable display device that can alleviate the drawback of the prior art.

According to the present disclosure, a load-adjustable display support device includes a support frame having opposite frame top and bottom ends, a sliding unit disposed on the support frame and slidable along the length of the support frame, and a load-adjusting unit disposed between the sliding unit and the support frame.

The sliding unit is configured for mounting a display thereon.

The load-adjusting unit includes at least one tension spring and an adjustment member. The at least one tension spring has a spring bottom end connected to the sliding unit, and a spring top end opposite to the spring bottom end and connected to the adjustment member. The at least one tension spring is configured to generate a tension force to bias the sliding unit to move between an upper limiting position, where the sliding unit is proximate to the frame top end, and a lower limiting position, where the sliding unit is proximate to the frame bottom end. The adjustment member is disposed on the support frame and is operable to move the spring top end along the length of the support frame for adjusting a tension of the at least one tension spring.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
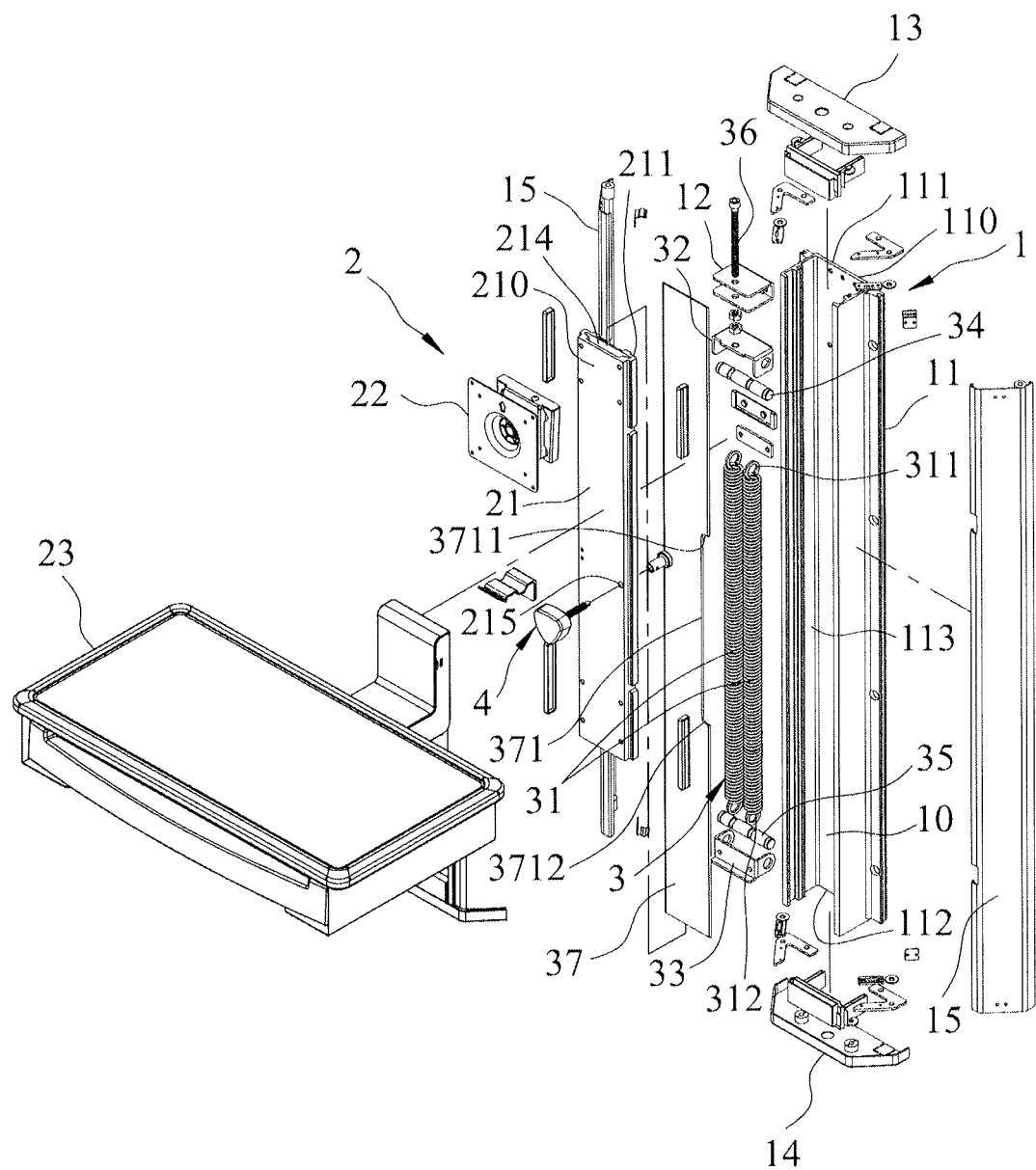
FIG. 1 is an exploded perspective view of a load-adjustable display support device according to an embodiment of the present disclosure.
Figure 2:
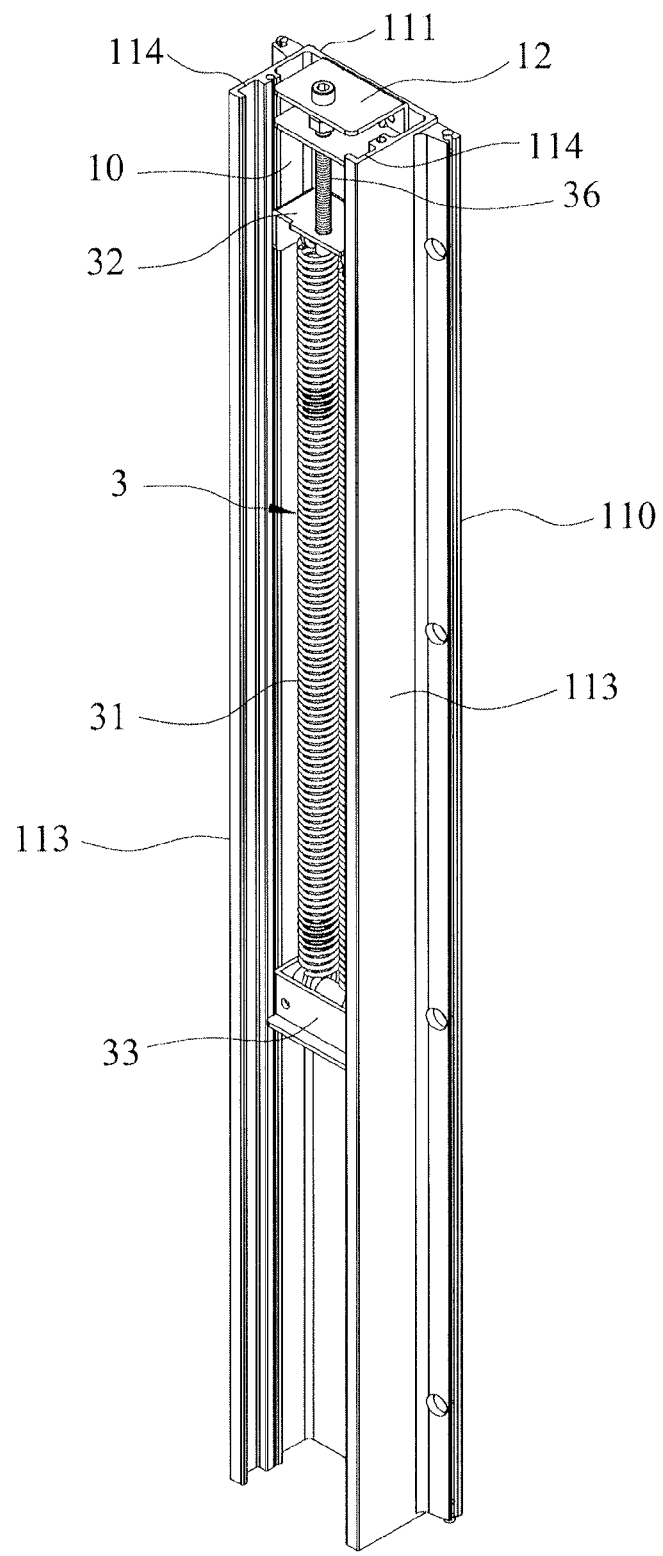
FIG. 2 is an assembled perspective view of a support frame and a load-adjusting unit of the embodiment.
Figure 3:
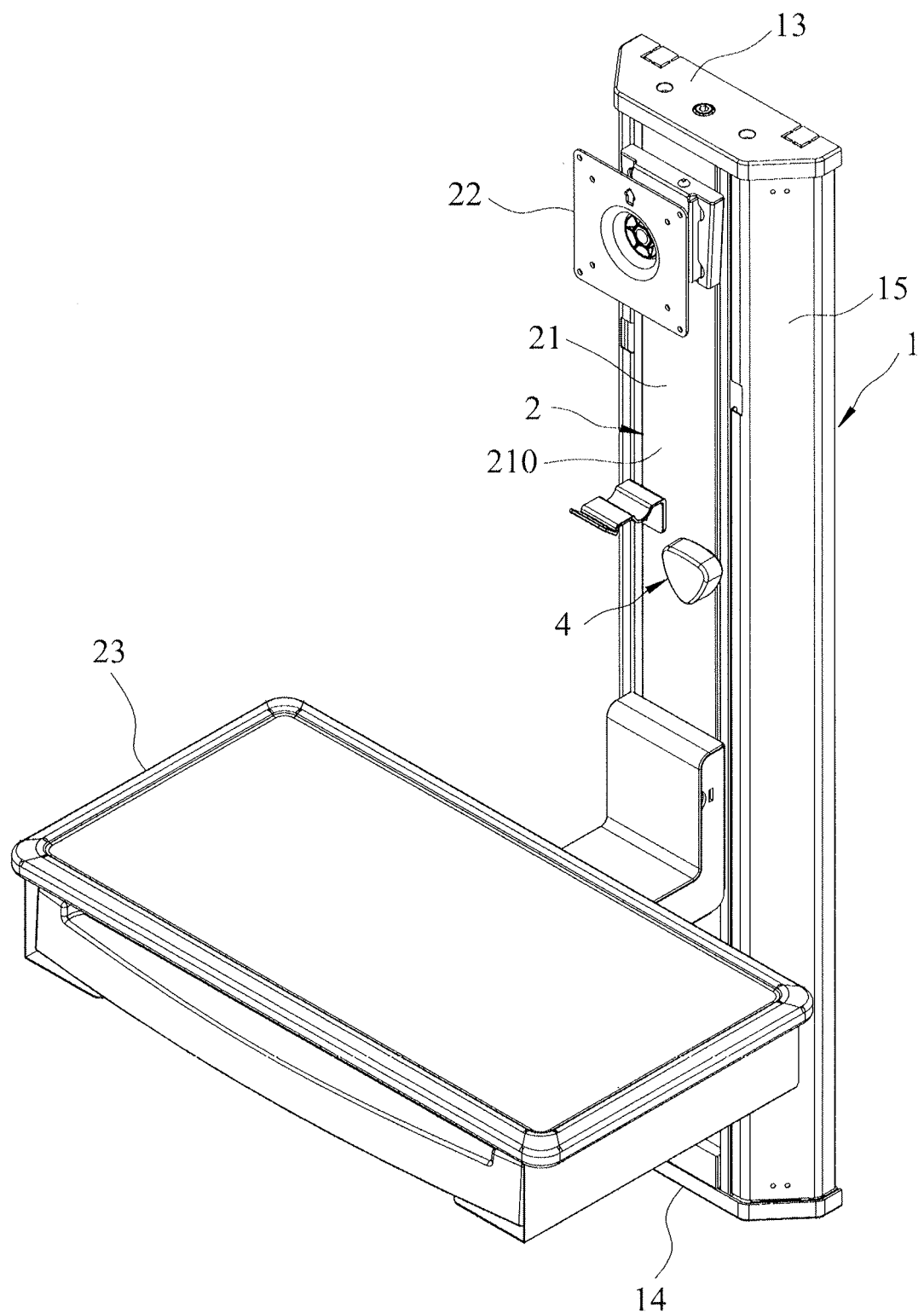
FIG. 3 is an assembled perspective view of the embodiment.

Referring to FIGS. 1 to 3 a load-adjustable display support device according to an embodiment of the present disclosure includes a support frame 1, a sliding unit 2, a load-adjusting unit 3, and a limiting member 4.

The support frame 1 includes a main body 11 extending along a longitudinal direction, a positioning seat 12, top and bottom plates 13, 14, and two decorative plates 15. The main body 11 includes an elongated base wall 110 having opposite frame top and bottom ends 111, 112, and two side walls 113 extending respectively and transversely from two opposite lateral sides of the base wall 110. The base wall 110 and the side walls 113 cooperatively define a receiving space 10 extending between the frame top and bottom ends 111, 112. The side walls 113 are respectively formed with slide grooves 114 that extend along the length thereof and that are distal from the base wall 110. The slide grooves 114 face the receiving space 10. The positioning seat 12 is fixed on the main body 11 within the receiving space 10 and is proximate to the frame top end 111. The top and bottom plates 13, 14 are respectively disposed on the frame top and bottom ends 111, 112 to cover top and bottom ends of the receiving space 10. The decorative plates 15 are respectively connected to the two opposite lateral sides of the base wall 110 to cover the side walls 113, respectively, and extend along the length of the main body 11.

The sliding unit 2 includes an elongated sliding member 21 that is slidable in the receiving space 10 and that has outer and inner surfaces 210, 211, a mounting seat 22 connected to the outer surface 210, and a working platform 23 connected to the outer surface 210 and spaced apart from the mounting seat 22. In this embodiment, the sliding member 21 has two opposite lateral edges slidably disposed in the sliding grooves 114 of the side walls 113, respectively, and defines a passage 214 that extends along the length thereof. Additionally, the sliding member 21 further has a pair of through holes 215 (only one is visible in FIG. 1) that are formed through the outer and inner surfaces 210, 211 in proximity to one of the lateral edges thereof, that are aligned with each other and that communicate with the passage 214.

The load-adjusting unit 3 is disposed between the sliding unit 2 and the support frame 1, and includes two tension springs 31, a top connection seat 32, a bottom connection seat 33, a top fastener 34, a bottom fastener 35, an adjustment member 36, and a cover plate 37.

Each tension spring 31 has a spring top end 311 proximate to the frame top end 111, and a spring bottom end 312 opposite to the spring top end 311 and proximate to the frame bottom end 112.

The bottom connection seat 33 is fixedly connected to the inner surface 211 of the sliding member 21 at a bottom end portion thereof.

The top fastener 34 extends through the top connection seat 32 and the spring top ends 311 of the tension springs 31 so as to secure the spring top ends 311 of the tension springs 31 to the top connection seat 32.

The bottom fastener 35 extends through the bottom connection seat 33 and the spring bottom ends 312 of the tension springs 31 so as to secure the spring bottom ends 312 of the tension springs 31 to the bottom connection seat 33.

The adjustment member 36 of this embodiment is a threaded rod that is threadedly inserted through the positioning seat 12 and that threadedly engages the top connection seat 32 such that the top connection seat 32 is spaced apart from the bottom connection seat 33. Rotation of the adjustment member 36 can drive the top connection seat 32 together with the spring top ends 311 of the tension springs 31 toward or away from the positioning seat 12 along the length of the support frame 1.

The cover plate 37 is inserted through the passage 214 and is positioned between the top and bottom plates 13, 14 so as to cover the tension springs 31 and the adjustment member 36. As such, the sliding member 21 is movable relative to the cover plate 37. The cover plate 37 has a cutout 371 that is formed in one lateral edge thereof, that communicates with the pair of the through holes 215, and that has opposite top and bottom edges 3711, 3712.

The limiting member 4 extends through the pair of the through holes 215 in the sliding member 21 and the cutout 371 in the cover plate 37 to tightly abut against the base wall 110 of the main body 11 so as to position the sliding unit 2 against the support frame 1. In this embodiment, the limiting member 4 is loosenable to permit movement of the sliding member 21 relative to the cover plate 37, and is movable along with the sliding member 21.

Figure 4:
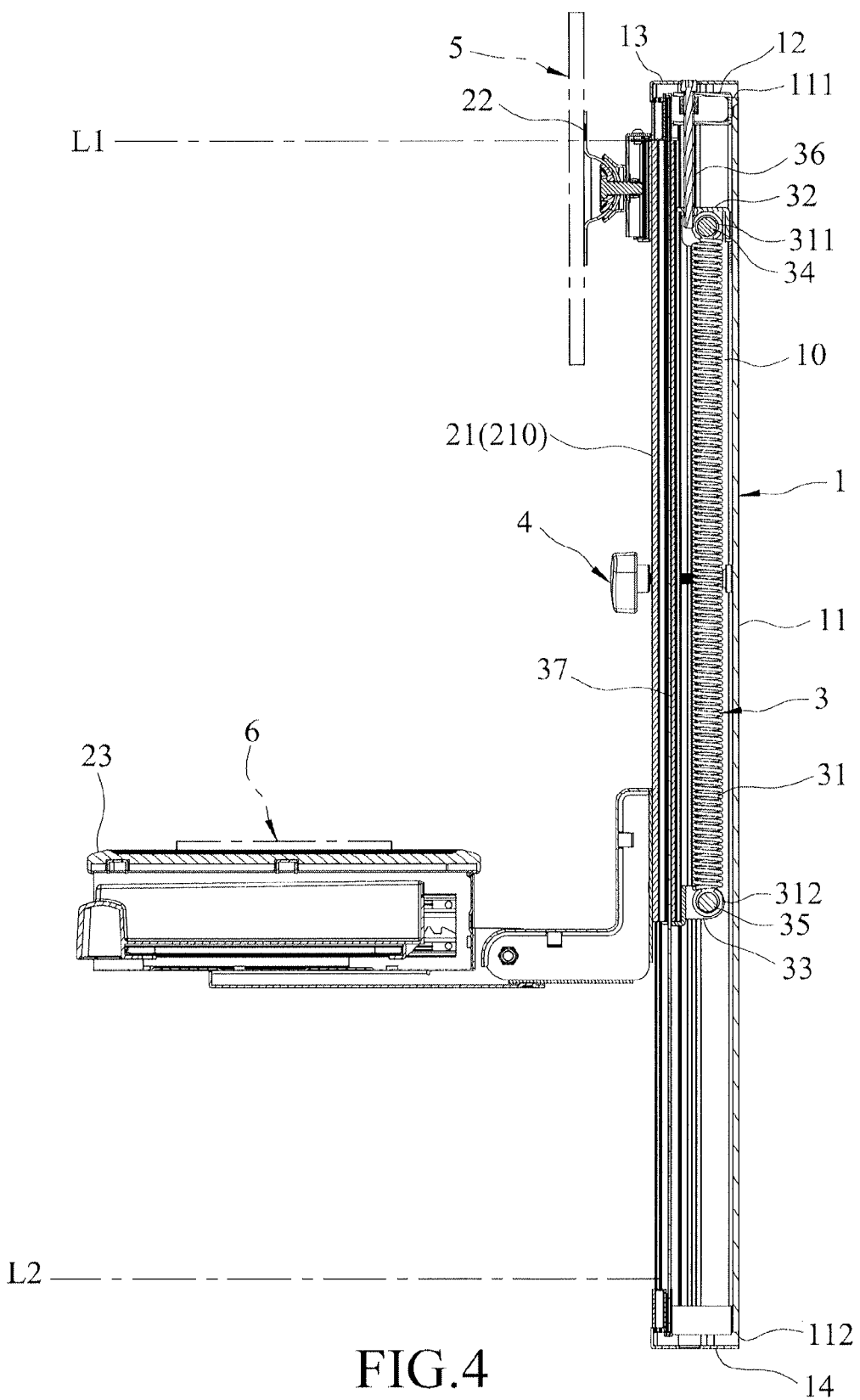
FIG. 4 is an assembled sectional view of the embodiment, illustrating a sliding unit being controlled by two tension springs and a limiting member to move between upper and lower limiting positions.
Figure 5:
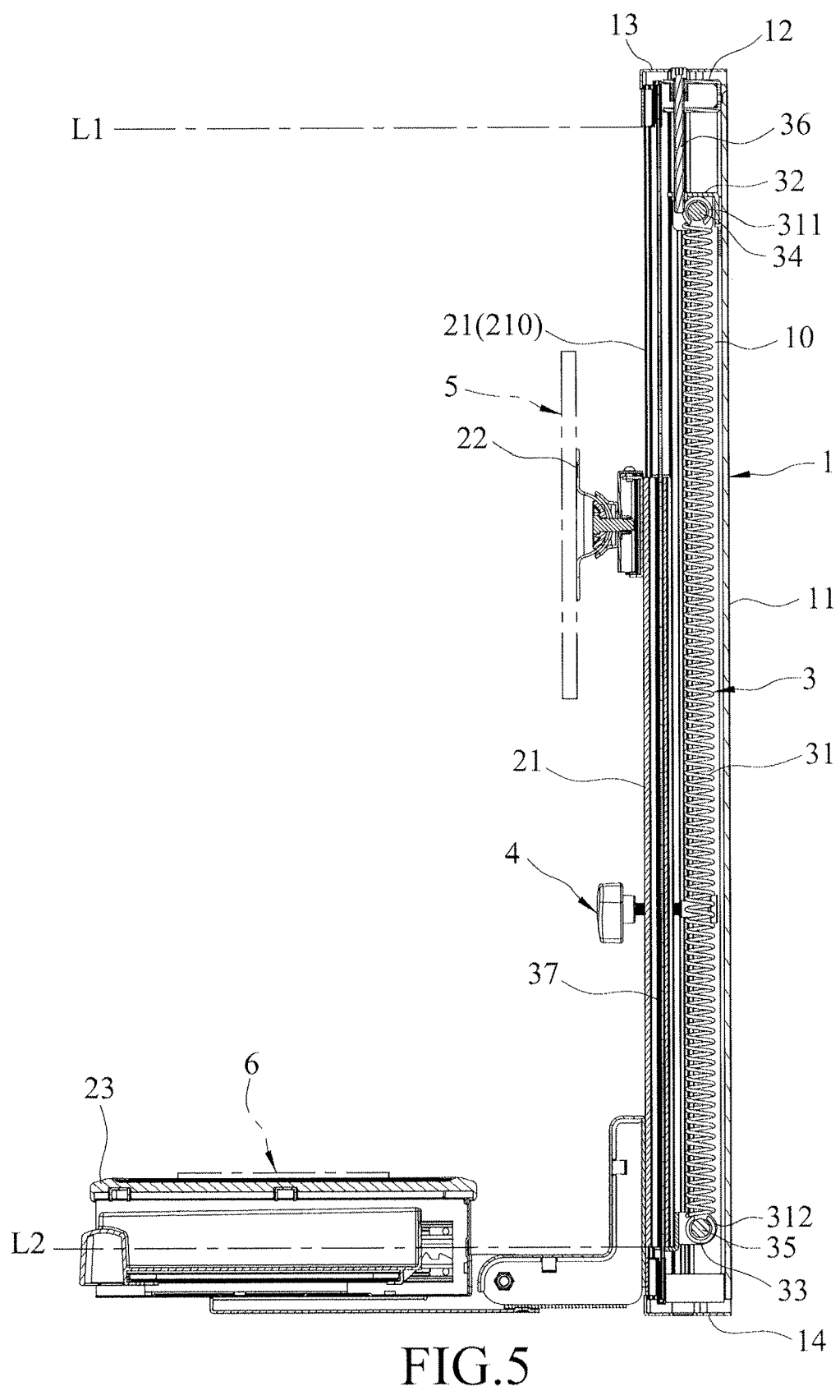
FIG. 5 is a view similar to FIG. 4, but illustrating the sliding unit in the lower limiting position.

Referring to FIGS. 4 and 5, the mounting seat 22 is configured for mounting a display 5 thereon. The working platform 23 is configured for placing a keyboard 6 or other articles (not shown). At this time, the sliding member 21 will bear the weights of the mounting seat 22 and the display 5 and the weights of the working platform 23 and the keyboard 6, so that a force of gravity exists in a downward direction.

When the limiting member 4 is loosened from the base wall 110 of the main body 11, due to the aforesaid force of gravity, the sliding member 21 can move downwardly relative to the cover plate 37 along the sliding grooves 114. Further, with the bottom connection seat 33 pulling the spring bottom ends 312 of the tension springs 31, the tension springs 31 will generate tension forces to bias the sliding unit 2 to move between an upper limiting position (L1), where the sliding unit 2 is proximate to the frame top end 111, and a lower limiting position (L2), where the sliding unit 2 is proximate to the frame bottom end 112. In the upper limiting position (L1), the limiting member 4 abuts against the top edge 3711 of the cutout 371. In the lower limiting position (L2), the limiting member 4 abuts against the bottom edge 3712 of the cutout 371.

Through this, a user only has to pull the sliding member 21 or the working platform 23 to arbitrarily and smoothly move the sliding unit 2 between the upper and lower limiting positions (L1, L2) with the tension forces of the tension springs 31 supporting the sliding unit 2.

When the limiting member 4 is tightened to abut against the base wall 110 of the main body 11, the sliding unit 2 is fixed to the support frame 1 at a desired position.

Figure 6:
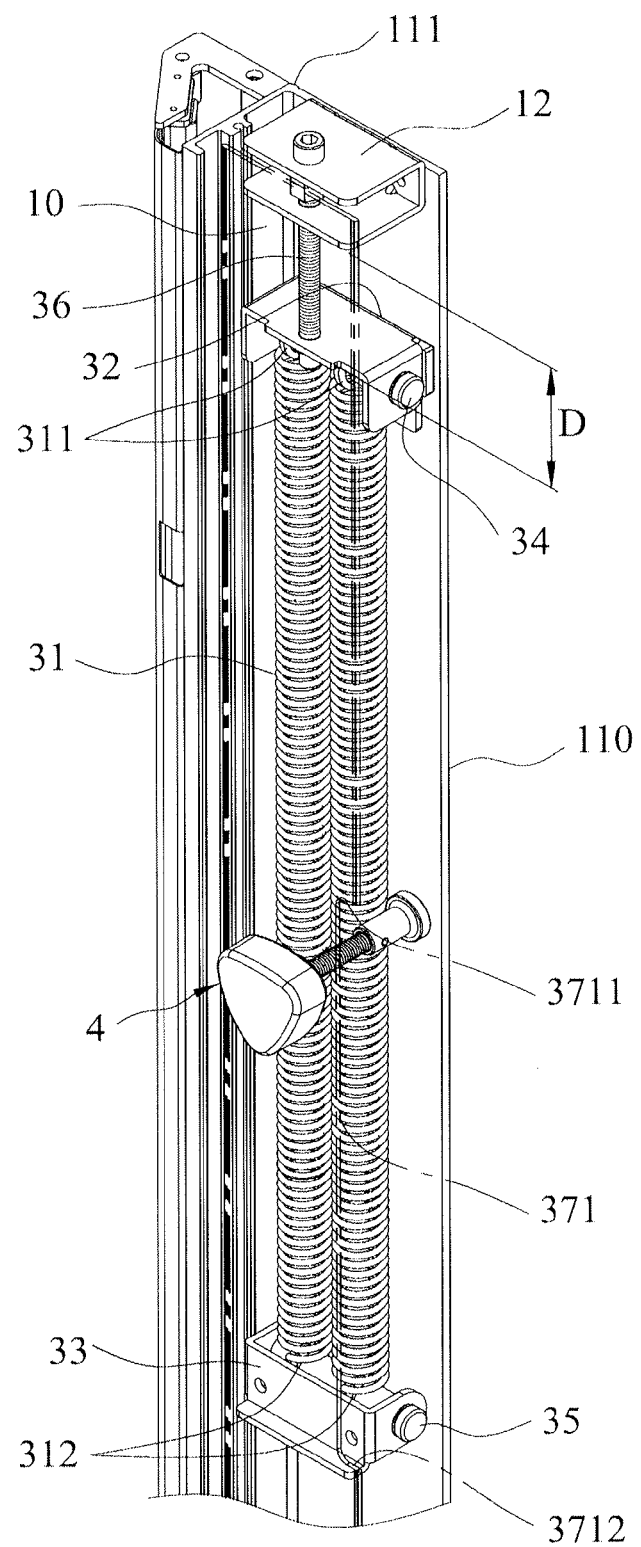
FIG. 6 is a fragmentary enlarged perspective view of the embodiment, illustrating an adjustment member being operated to move spring top ends of the tension springs away from a positioning seat.
Figure 7:
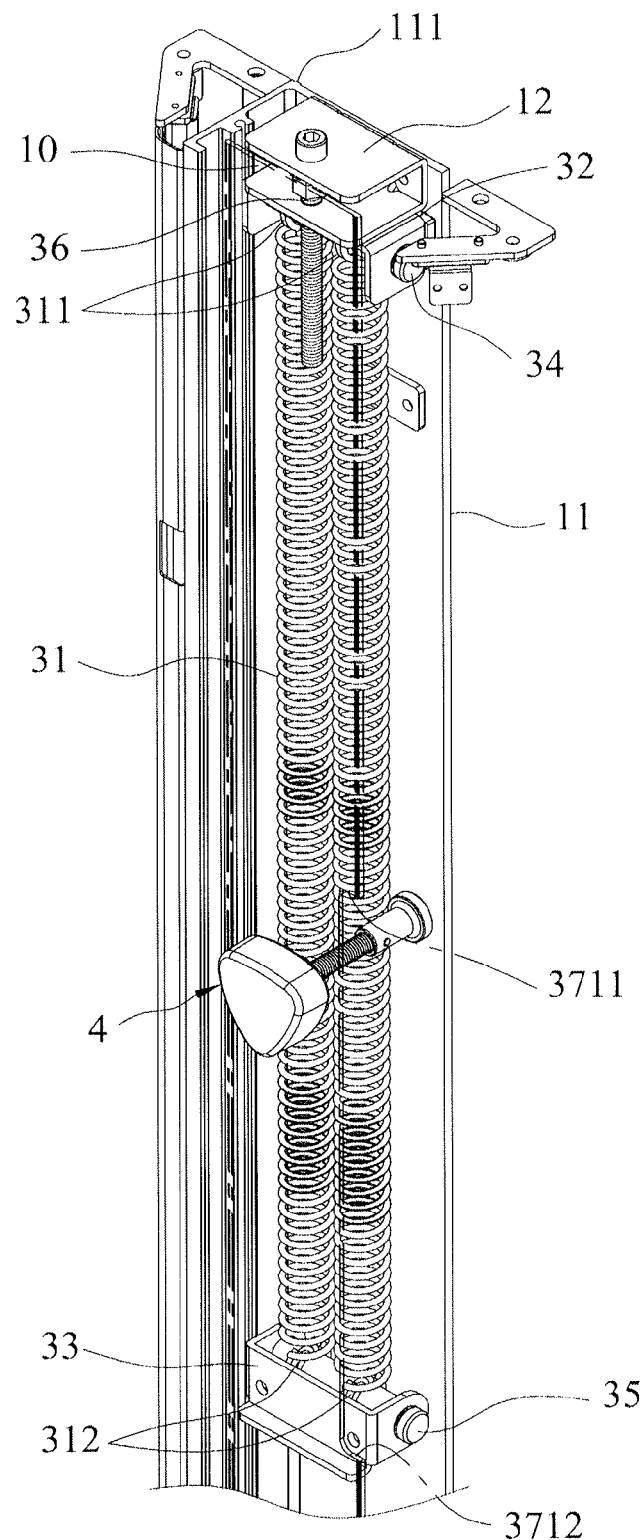
FIG. 7 is a view similar to FIG. 6, but illustrating the adjustment member being operated to move the spring top ends of the tension springs toward the positioning seat.

Referring to FIGS. 6 and 7, when the loading weight of the sliding member 21 is changed and reduced, the adjustment member 36 is rotated clockwise to threadedly drive the top connection seat 32 away from the positioning seat 12 at a distance (D). Through this, tensions of the tension springs 31 can be reduced to prevent the rapid upward movement of the sliding member 21 due to excessive tension when the limiting member 4 is suddenly loosened. It should be noted that the adjustment member 36 is rotatable relative to the positioning seat 12, but is not movable relative to the positioning seat 12.

Similarly, when the loading weight of the sliding member 21 is changed and increased, the adjustment member 36 is rotated counterclockwise to threadedly drive the top connection seat 32 toward the positioning seat 12 so as to shorten the distance (D) between the two. The shortest distance between the top connection seat 32 and the positioning seat 12 is when the top connection seat 32 abuts against the positioning seat 12. Through this, tensions of the tension springs 31 can be provided to prevent the rapid downward movement of the sliding member 21 due to reduced tension when the limiting member 4 is suddenly loosened.

Through the aforesaid description, the advantages of the load-adjustable display support device of the present disclosure can be summarized as follows:

1. The tension springs 31 can substitute the pressure cylinder used in the conventional display support device, so that the cost of this disclosure is not only reduced, the assembly thereof is also easy.

2. Because the tension of the load-adjusting unit 3 can be adjusted according to the loading weight of the sliding member 21, the smooth movement of the sliding member 21 can be assisted so as to enhance the safety in use.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A load-adjustable display support device comprising:
a support frame including a main body that has opposite frame top and bottom ends and that defines a receiving space extending between said frame top and bottom ends;
a sliding unit disposed on said support frame and slidable along a length of said support frame, said sliding unit including a sliding member that is slidable in said receiving space and that has outer and inner surfaces, and a mounting seat disposed on said outer surface of said sliding member and configured for mounting a display thereon;
a load-adjusting unit disposed between said sliding unit and said support frame, and including at least one tension spring and an adjustment member, said at least one tension spring having a spring bottom end connected to said sliding unit, and a spring top end opposite to said spring bottom end and connected to said adjustment member, said at least one tension spring being configured to generate a tension force to bias said sliding unit to move between an upper limiting position, where said sliding unit is proximate to said frame top end, and a lower limiting position, where said sliding unit is proximate to said frame bottom end, said adjustment member being disposed on said support frame and being operable to move said spring top end along the length of said support frame for adjusting a tension of said at least one tension spring; and
a limiting member extending through said sliding member to tightly abut against said main body so as to position said sliding unit against said support frame, wherein:
said sliding member defines a passage that extends along the length thereof, and has a pair of through holes that are formed through said outer and inner surfaces thereof in proximity to a lateral edge of said sliding member, that are aligned with each other and that communicate with said passage;
said load-adjusting unit further includes a cover plate that is inserted through said passage and that covers said at least one tension spring and said adjustment member, said cover plate having a cutout that is formed in one lateral edge of said cover plate, that communicates with said pair of said through holes, and that has opposite top and bottom edges;
said limiting member extends through said pair of said through holes in said sliding member and said cutout in said cover plate to tightly abut against said main body of said support frame, said limiting member being loosenable to permit movement of said sliding member relative to said cover plate, and being movable along with said sliding member; and
said sliding member is movable relative to said cover plate between said upper limiting position, where said limiting member abuts against said top edge of said cutout, and said lower limiting position, where said limiting member abuts against said bottom edge of said cutout.

2. The load-adjustable display support device as claimed in claim 1, wherein:
said support frame further includes a positioning seat that is fixed on said main body within said receiving space and that is proximate to said frame top end; and
said adjustment member is disposed on said positioning seat to move said spring top end toward or away from said positioning seat.

3. The load-adjustable display support device as claimed in claim 1, wherein:
said load-adjusting unit includes two said tension springs, and further includes a bottom connection seat connected to said sliding unit, and a top connection seat spaced apart from said bottom connection seat;
said adjustment member threadedly extending through said top connection seat; and
said spring bottom ends of said tension springs are connected to said bottom connection seat, and said spring top ends of said tension springs are connected to said top connection seat.

4. The load-adjustable display support device as claimed in claim 3, wherein said load-adjusting unit further includes a bottom fastener securing said spring bottom ends of said tension springs to said bottom connection seat, and a top fastener securing said spring top ends of said tension springs to said top connection seat.

5. The load-adjustable display support device as claimed in claim 1, wherein said support frame further includes top and bottom plates that are respectively disposed on said frame top and bottom ends to cover top and bottom ends of said receiving space, and two decorative plates that are respectively disposed on two opposite lateral sides of said main body and that extend along the length of said support frame.

6. A load-adjustable display support device comprising:
a support frame including a main body that has opposite frame top and bottom ends and that defines a receiving space extending between said frame top and bottom ends;
a sliding unit disposed on said support frame and slidable along a length of said support frame, said sliding unit including a sliding member that is slidable in said receiving space and that has outer and inner surfaces, and a mounting seat disposed on said outer surface of said sliding member and configured for mounting a display thereon;
a load-adjusting unit disposed between said sliding member and said support frame, and including at least one tension spring and an adjustment member, said at least one tension spring having a spring bottom end connected to said sliding unit, and a spring top end opposite to said spring bottom end and connected to said adjustment member, said at least one tension spring being configured to generate a tension force to bias said sliding member to move between an upper limiting position, where said sliding member is proximate to said frame top end, and a lower limiting position, where said sliding member is proximate to said frame bottom end, said adjustment member being disposed on said support frame and being operable to move said spring top end along the length of said support frame for adjusting a tension of said at least one tension spring; and
a limiting member extending through said sliding member to tightly abut against said main body so as to position said sliding member against said main body;
said load-adjusting unit further including a cover plate that covers said at least one tension spring and said adjustment member, said cover plate having a cutout that is formed in one lateral edge of said cover plate and that has opposite top and bottom edges;
said limiting member extending through said sliding member and said cutout in said cover plate to tightly abut against said main body of said support frame, said limiting member being loosenable to permit movement of said sliding member relative to said cover plate, and being movable along with said sliding member;

said sliding member being movable relative to said cover plate between said upper limiting position, where said limiting member abuts against said top edge of said cutout, and said lower limiting position, where said limiting member abuts against said bottom edge of said cutout.

\* \* \* \* \*